3,773,768
Patented Nov. 20, 1973

3,773,768
7 - AMINO - 2 - CHLORO-11-(4-METHYL-1-PIPER-AZINYL)DIBENZ[b,f][1,4]OXAZEPINE AND SALTS THEREOF
Charles Frederic Howell, Upper Saddle River, N.J., and Eugene Newton Greenblatt, Spring Valley, N.Y., assignors to American Cyanamid Company, Stamford, Conn.
No Drawing. Continuation-in-part of application Ser. No. 220,371, Jan. 24, 1972, now Patent No. 3,705,245, which is a continuation-in-part of application Ser. No. 84,221, Oct. 26, 1970, now Patent No. 3,660,406. This application Aug. 11, 1972, Ser. No. 280,033
Int. Cl. C07d 51/70
U.S. Cl. 260—268 TR         8 Claims

ABSTRACT OF THE DISCLOSURE

Preparation of 7-amino-2-chloro-11-(4-methyl-1-piperazinyl)dibenz[b,f][1,4]oxazepine and pharmaceutically acceptable acid addition salts by several methods is described. These compounds are useful for their effects on the central nervous system such as tranquilizers and antidepressants.

---

This application is a continuation-in-part of our application Ser. No. 220,371, filed Jan. 24, 1972, now U.S. Pat. 3,705,245 which is a continuation-in-part of application Ser. No. 84,221, filed Oct. 26, 1970, now U.S. Pat. 3,660,406.

DESCRIPTION OF THE INVENTION

This invention relates to new organic compounds, more particularly to 2 - chloro - 7 - amino-11-(4-substituted-1-piperazinyl)dibenz[b,f][1,4]oxazepine and to intermediates and methods of preparing the same.

The novel compounds of the present invention may be illustrated by the formula:

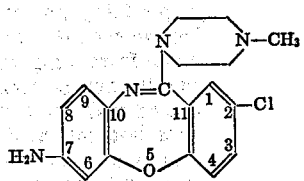

and pharmaceutically acceptable non-toxic acid addition salts thereof.

The compounds of this invention are generally moderately high-melting solids which are either colorless to pale yellow or tan. The base is in general moderately insoluble in water but more soluble in lower alkanols such as methanol and ethanol. The salts such as the hydrochloride, sulfate, phosphate, acetate, succinate, tartrate, citrate, and maleate are more soluble in water than the base. Other salts are useful such as the enanthate, decanoate, pamoate and the like. In such salts, at least in solution, the proton from the acid is believed to be bonded predominantly to the most basic cite which is the 4'-amino group of the piperazine moiety.

The present compounds are administered either orally or parenterally in doses sufficient to produce a physiologically desirable effect on the central nervous system of warm-blooded animals.

The base compound of the present invention exhibits valuable and unobvious central nervous system (CNS) properties at non-toxic doses as demonstrated by the accompanying Table I. An indication of potential tranquilizing activity is provided by testing for reduction of motor activity in animals as described, for example, by R. H. Rech and K. E. Moore, "An Introduction to Psycopharmacology," Raven Press, New York, 1971, p. 263. Particular procedures are described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957). The test compounds are administered intraperitoneally in graded doses to 6 to 10 rats. After 1 hour, a 5-minute count of motor activity for each rat is recorded in an activity counter (a photoelectric device for measuring locomotor activity). The motor depressant dose which causes a 50% reduction of the motor activity count over controls is then estimated ($MD_{50}$). Table I provides $MD_{50}$ data for the instant compound and three structural variants.

Antagonism of apomorphine-induced gnawings ($AG_{50}$) behavior in rats as a method of evaluating tranquilizing agents has been described by P. A. Janssen et al., Arzneimittel Forschung, vol. 10, pp. 1003–1005 (1960) and by G. Stille et al., Arzneimittel Forschung, vol. 15, pp. 841–843 (1965). The following procedure is a modification of that of Janssen et al. Graded doses of the test compounds are administered intraperitoneally to groups of 8 rats each one hour before the intravenous injection of 1.2 mg./kg. of apomorphine (estimated to cause gnawing behavior in 100% of the rats). The gnawing syndrome is described as a compulsive and continuous sniffing followed by hard biting of the wire mesh cage floor, and is apparent within 10 minutes and lasts for about 45 minutes. The presence or lack of gnawing behavior in each rat is recorded by observation. For each experimental run there are two control rats treated with starch vehicle one hour before the apomorphine. The doses ($AG_{50}$) required to antagonize the gnawing behavior in 50% of the rats are calculated, with statistical confidence limits, if desired.

While many major tranquilizers are active against apomorphine-induced gnawing in rats, these agents also have a high liability to produce "extrapyramidal side effects." It is now widely recognized that tranquilizers with minimal or no activity in this test system are less likely to produce this undesirable effect: P. A. Janssen, C. J. E. Niemegeers and K. H. L. Schellekens, Arzneimittel Forschung, vol. 15, p. 104 (1965); G. Stille, Schweizerische Medizinische Wochenschrift, vol. 99, p. 1645 (1969). The much lower activity of 7-amino-2-chloro-11-(4-methyl-1-piperazinyl) dibenzyl[b,f][1,4]oxazepine (VII), compared to the analogous compounds, is evident from the following Table I.

TABLE I

| Compound | | $AG_{50}$ | $MD_{50}$ |
|---|---|---|---|
| II....... 2-chloro-11-(4-methyl-1-piperazinyl)-dibenz[b,f] [1,4]oxazepine. | { | ¹ 0.025<br>0.016–0.038 } | 0.24 |
| IV...... 2-chloro-11-(4-methyl-1-piperazinyl)-7-nitrodibenz[b,f] [1,4]oxazepine. | { | 12<br>¹ 8–17 } | 28 |
| VI...... 7-amino-2-chloro-11-(4-methyl-1-piperazinyl)dibenz[b,f] [1,4]-oxazepine. | | >40 | 4.1 |
| VIII.... 2-chloro-7-hydroxy-11-(4-methyl-1-piperazinyl)dibenz[b,f] [1,4]-oxazepine. | { | ¹ 0.0075<br>0.0034–0.0170 } | 0.43 |

¹ Confidence limits.

Several procedures are used for preparation of the base compound of the present invention. Particularly described are substitution reactions proceeding from known compounds such as 2 - chlorodibenz[b,f][1,4]oxazepin-11-(10H)-one (I) (flowsheet hereinafter) and 2-chloro-11-(4-methyl-1-piperazinyl)dibenz[b,f][1,4]oxazepine (II). Nitrations are particularly suitable since these reactions lead preponderantly to 7- and 9-substituted derivatives under ordinary conditions wherein the reacting moiety is not protonated at the 10-position or on the substituent attached to the 11-position. The desired 7-substituted isomer is then separated from the isomeric impurity by fractional crystallization or by chromatographic techniques well known to those skilled in the art.

Nitration of the lactam (I) with an appropriate nitrating agent such as nitric acid in dry acetic acid yields a mixture of 7- and 9 - nitro - 2 - chlorodibenz[b,f][1,4] oxazepin-11(10H)-ones from which the desired 7-nitro isomer (III) separates merely by cooling the reaction mixture. Similarly, nitration of the N-methylpiperazine derivative (II) with, for example, acetyl nitrate in acetic acid yields a mixture of the 7- and 9-nitro isomers which is separated, for example, by partition or by thin layer chromatography (TLC), to give largely the desired 7-nitro isomer.

The compounds (III) and (IV) with nitro substituents in the 7-position are then converted into the 7-amino or 7-hydroxy derivatives by a variety of procedures. Reduction of the nitro derivatives yields the 7-amino compounds (V) and (VI). Particularly suitable are chemical reducing agents such as iron, sodium dithionite and zinc which do not attack the aromatic chloro group. Zinc dust in aqueous ethanol containing a small amount of calcium chloride has proven efficacious and is a mild neutral reagent (Examples 3 and 4 hereinafter). It is to be noted that the 7-nitrolactam compound (III) may be converted to derivatives within the piperazinyl series by treatment with any of a variety of imino halide generation agents such as phosphorus pentachloride, phosphorus oxychloride, phosphorus pentabromide and the like followed by treatment of the "activated amide" with the desired piperazine derivative. The reverse transformation may also be effected by boiling the piperazine derivative with dilute aqueous mineral acids.

The desired amino derivatives compound (V) and (VI) are then converted to the hydroxy compounds if desired, by diazotization followed by replacement of the diazonium function either chemically of photochemically. Although the replacement may be effected by diazotizing with an alkali metal or alkaline earth metal nitrite in dilute aqueous mineral acid such as sulfuric or phosphoric acids at low temperature followed by boiling the resulting salt with a copper salt such as cupric sulfate or with aqueous sulfuric acid, the yields of such reactions are inferior to those obtained by an indirect procedure. Preferably, the amine salt is dissolved in acetic acid and diazotized with an alkyl nitrite such as butyl or iso-amyl nitrite. The diazonium salt is then boiled in situ with added acetic anhydride and the resulting 7-acetoxy derivative is stirred overnight with aqueous sodium hydroxide or other hydroxylic base to yield the 7-hydroxy derivative compound (VII) or (VIII). Additionally, the 7-hydroxy lactam (VII) is converted to the 7-piperazinyl derivative (VIII) by the methods described above for the 7-nitro lactam (III) though in this case also it is preferable to "block" the hydroxyl function with an acetyl or other suitably labile blocking group such as t-butyl using the methods well known to those skilled in the art. The following flowsheet illustrates the reactions described above.

FLOWSHEET

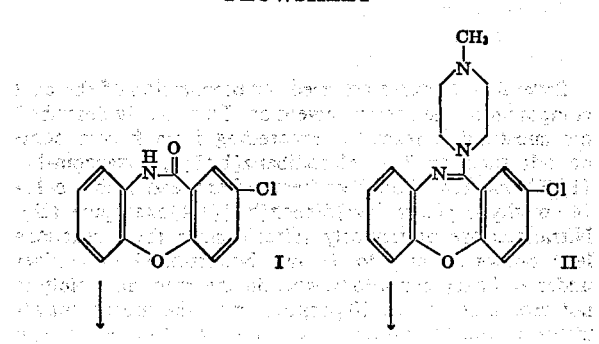

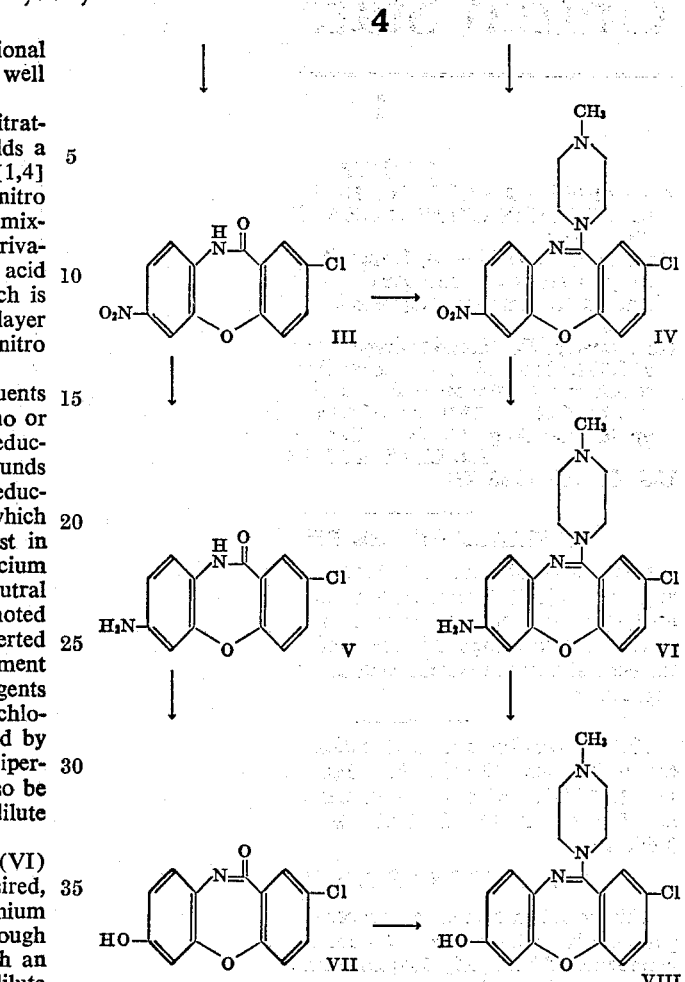

The present compounds, generally in the form of their salts, may be administered orally or parenterally in doses of 1 mg. to 100 mg. per kilogram per day and when so administered, are effective central nervous system agents. A dose unit may contain from 5 mg. to 500 mg. of drug. For oral administration the new compounds of this invention may be incorporated with the usual pharmaceutical excipients and used for instance, in the form of tablets, capsules, dragées, liquids to be administered in drops, emulsions, suspensions and syrups, and in chocolate, candy, chewing gum and the like. They may also be administered in suppositories, and in aqueous solutions for parenteral injection.

SPECIFIC DETAILS

The following examples describe various methods by which the present compounds can be prepared.

EXAMPLE 1

Preparation of 2-chloro-7-nitrodibenz[b,f][1,4] oxazepin-11(10H)-one

To a solution of 24.5 g. of 2-chlorodibenz[b,f][1,4] oxazepin-11(10H)-one in 1 liter of acetic acid at 90° C. is added dropwise 22.4 ml. of an acetyl nitrate solution prepared previously by slowly adding 10.4 ml. of red fuming nitric acid to an ice cold mixture of 9.5 ml. of acetic acid and 9.25 ml. of acetic anhydride. The red fuming solution deposits nearly colorless crystals after 5–10 minutes and the addition takes about 30 minutes. After 3 hours at 90–95° C. the mixture is cooled to 25° C. and filtered. [The filtrate on dilution with water (1 liter) deposits the bulk (3.4 g.) of the yellow 9-nitro isomer.] The colorless crystalline solid is washed with acetic acid and ether and dried to give 17.8 g. (62%) of colorless 2 - chloro-7-nitrodibenz[b,f][1,4] oxazepin-11(10H)-one, melting point 345–350° C. When recrystallized from 250 parts of acetic acid, the fine, colorless needles have a melting point of 358–359° C., or melting point 360° C. after sublimation; ultraviolet (UV) max. (CH$_3$OHHCl) 330, (broad) 295 m$\mu$; infrared (IR) (KBr) 5.75, 6.45, 7.4$\mu$.

EXAMPLE 2

Preparation of 2-chloro-11-(4-methyl-1-piperazinyl)-7-nitrodibenz[b,f][1,4]oxazepine (A) A suspension of 5.8 g. of 2-chloro-7-nitrodibenz[b,f][1,4]oxazepin-11(10H)-one (Example 1) in 80 ml. of o-dichlorobenzene is heated and the solvent is distilled into an alembic to dry equipment and reagents. The mixture is cooled and treated with 5.9 g. of phosphorus pentachloride. The mixture is heated and 20 ml. of distillate is collected which contains the phosphorus oxychloride formed in the reaction. The slightly cooled solution is treated with 10 ml. of N-methylpiperazine, heated to reflux 10 minutes and cooled. The solution is extracted with two 100-ml. portions of N-hydrochloric acid and the oily base is precipitated from the aqueous (top) layer with concentrated ammonium hydroxide. The base is collected, dissolved in 80 ml. of 2 N acetic acid, treated with activated charcoal, filtered and reprecipitated. Magnetic stirring with a small amount of methanol overnight gives orange crystals of 2-chloro-11-(4-methyl-1-piperazinyl)-7-nitrodibenz[b,f][1,4]oxazepine, melting point 161–168° C.; UV max. (CH$_3$OH) 352, 300 m$\mu$; IR (KBr) 3.6, 6.3, 6.5, 7.5, 9.95$\mu$.

(B) To a solution of 3.27 g. of 2-chloro-11-(4-methyl-1 - piperazinyl)dibenz[b,f][1,4]oxazepine in 3 ml. of acetic anhydride and 5 ml. of acetic acid at 0° C. is added 3 ml. of acetyl nitrate prepared as described in Example 1. The solution is stirred 1 hour each at 0° C. and 25° C. and poured onto 30 g. of ice. The aqueous layer is decanted and the orange oil is washed again with water. The oil is stirred with dilute ammonium hydroxide, redissolved in 40 ml. of 10% hydrochloric acid and precipitated again with ammonium hydroxide to give 2.14 g. of a mixture with at least 3 yellow compounds when subjected to thin layer chromatography (TLC) on silica gel plates developed with 5% methanol in ether. Partition chromatography of 1.6 g. of this mixture using heptane-methanol on 1.1 kg. of diatomaceous earth gives in the second hold-back volume 707 mg. (27%) of 2-chloro-11(4-methyl-1-piperazinyl)-7-nitrodibenz[b,f][1,4]oxazepine with melting point, IR, and TLC indistinguishable from a sample prepared by procedure A.

EXAMPLE 3

Preparation of 7-amino-2-chlorodibenz[b,f][1,4] oxazepine-11(10H)-one

A suspension of 5.8 g. of 2-chloro-7-nitrodibenz[b,f][1,4]oxazepin-11(10H)-one (Example 1) and 42 g. of zinc dust previously washed with dilute hydrochloric acid is refluxed with 140 ml. of 78% aqueous ethanol and 14.4 ml. of the calcium chloride solution prepared by dissolving 10 g. of calcium chloride in 10 ml. of water. Vigorous stirring and refluxing for 20 hours is necessary for complete reduction. The reaction mixture is filtered and the filter cake exhaustively extracted with hot ethanol. Concentration of the filtrate yields crude product which is washed with 2 N acetic acid and water to remove zinc salts and then sublimed to give 4.7 g. (90%) of 7-amino-2-chlorodibenz[b,f][1,4]oxazepin-11(10H)-one, melting point 227.5–229° C.; UV max. (CH$_3$OH) 295, 247 m$\mu$; IR (KBr) 3.15, 3.3, 6.0, 6.1, 6.5$\mu$.

Reduction with zinc dust in acetic acid containing concentrated hydrochloric acid is also effective but the product is contaminated with the 7-acetamido derivative.

EXAMPLE 4

Preparation of 7-amino-2-chloro-11-(4-methyl-1-piperazinyl)dibenz[b,f][1,4]oxazepine To a suspension of 3.72 g. of 2-chloro-11-(4-methyl-1-piperazinyl)-7-nitrodibenz[b,f][1,4]oxazepine in 72 ml. of 78% aqueous ethanol is added 7.2 ml. of a solution of calcium chloride (Example 3) followed by 21 g. of acid-washed zinc dust. The mixture is stirred and refluxed for 2 hours and then filtered and concentrated. The base is dissolved in 120 ml. of 0.25 N hydrochloric acid containing a little sodium bisulfite and then precipitated with ammonium hydroxide. Recrystallization from ethyl acetate and from ethanol affords yellow prisms of 7-amino-2-chloro-11(4-methyl-1-piperazinyl)dibenz[b,f][1,4]oxazepine, melting point 214–216° C.; UV max. (CH$_3$OH) (br.), 273 m$\mu$; IR (KBr) 2.9, 3.0, 3.1, 3.6, 6.15, 6.25, 9.95$\mu$.

Salts such as the hydrochloride, phosphate, acetate, succinate, pamoate or sulfate are prepared in a manner well known to those skilled in the art, for example, treating the above base compound with an equivalent amount of the acid in ethanol or acetone and precipitating with ether or petroleum ether.

EXAMPLE 5

Preparation of 2-chloro-7-hydroxydibenz[b,f][1,4]oxazepin-11(10H)-one

To a warm solution of 5.2 g. of 7-amino-2-chlorodibenz[b,f][1,4]oxazepin - 11(10H)-one in 60 ml. of glacial acetic acid is added 22 ml. of N sulfuric acid in acetic acid and the resulting suspension is cooled to 20° C. The mixture is treated with 4.5 ml. of i-amyl nitrite and stirred at 20–30° C. for 1 hour and warmed to 60° C. to complete the diazotization. The solution is treated with 50 ml. of acetic anhydride and heated cautiously to 110° C. when nitrogen evolution becomes vigorous. The reaction is completed by refluxing for 30 minutes and then pouring onto 400 g. of ice. This 7-acetoxy product is collected on a filter and then stirred overnight with 200 ml. of 2 N sodium hydroxide. The resulting solution is treated with activated charcoal, filtered and treated with saturated ammonium chloride solution (pH ca. 8). The product is collected and sublimed under reduced pressure to give 3.2 g. (61%) of 2 - chloro-7-hydroxydibenz[b,f][1,4]oxazepin-11(10H)-one, melting point 267–271° C. indistinguishable by IR and TLC from a sample melting point 266–9° C. which gave UV max (CH$_3$OH) 287 m$\mu$ and IR (KBr) 3.2, 6.0, 6.07, 6.27$\mu$.

EXAMPLE 6

Preparation of 2-chloro-7-hydroxy-11-(4-methyl-1-piperazinyl)dibenz[b,f][1,4]oxazepine (A) To a solution of 684 mg. of 7-amino-2-chloro-11-(4-methyl-1-piperazinyl)dibenz[b,f][1,4]oxazepine in 6 ml. of glacial acetic acid is added 4.4 ml. of N sulfuric acid in acetic acid with stirring. The resulting precipitate is treated with 0.45 ml. of iso-amyl nitrite and stirred at room temperature for 1.5 hours. The solution is treated with 5 ml. of acetic anhydride, warmed cautiously to 90° C. and, after the evolution of nitrogen has subsided, refluxed 10 minutes. The solution is diluted with water to 100 ml., treated with activated charcoal, filtered and treated with conc. ammonium hydroxide. The precipitate is extracted with dichloromethane and the resulting solution is concentrated. The residue is then stirred with 10 ml. each of N-potassium hydroxide and ethanol overnight, diluted with 10 ml. of water and filtered again with activated charcoal. The product is precipitated with a saturated solution of ammonium chloride and subjected to preparative TLC on silica gel plates developed with 10% methanol in ether. The major band (detected by quenching of the fluorescence of the TLC plate) is eluted with methanol and concentrated. The residue is taken up in 2 N acetic acid, filtered and precipitated with ammonium hydroxide to yield 225 mg. (33%) of 2-chloro-7-hydroxy-11-(4-methyl - 1 - piperazinyl)dibenz[b,f] 1,4]oxazepine, melting point 247–257° C. (dec.) When purified by sublimation this compound has melting point 252–257° C. (dec.); UV max. (CH₃OH) 340 (br), 300 (br.), 253 mμ; IR (KBr) 3.6, 6.2, 6.8, 9.0μ.

(B) A suspension of 606 mg. of 7-acetoxy-2-chlorodibenz[b,f][1,4]oxazepin-11(10H)-one (melting point 240–245° C.), prepared by boiling the 7-hydroxy lactam (Example 5) with acetic anhydride, in 15 ml. of toluene is partially distilled, treated with phosphorus pentachloride and then with N-methylpiperazine by the procedure (A) of Example 2. There is obtained 419 mg. (61%) of 2-chloro-7-hydroxy-11-(4 - methyl - 1 - piperazinyl)dibenz[b,f][1,4]oxazepine, melting point 232–244° C. (dec.) without chromatographic purification but having IR and TLC behavior substantially identical with a sample made by procedure (A).

What is claimed is:

1. A compound of the formula:

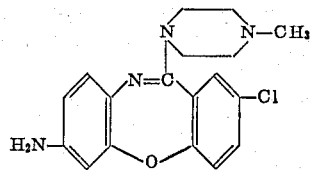

and pharmaceutically acceptable non-toxic acid addition salts thereof.

2. The compound in accordance with claim 1, 2-chloro-7-amino-11-(4 - methyl - 1 - piperazinyl)dibenz[b,f][1,4]oxazepine.

3. The compound in accordance with claim 1, 2-chloro-7-amino-11-(4 - methyl - 1 - piperazinyl)dibenz[b,f][1,4]oxazepine hydrochloride.

4. The compound in accordance with claim 1, 2-chloro-7-amino-11-(4 - methyl - 1 - piperazinyl)dibenz[b,f][1,4]oxazepine sulfate.

5. The compound in accordance with claim 1, 2-chloro-7-amino-11-(4 - methyl - 1 - piperazinyl)dibenz[b,f][1,4]oxazepine phosphate.

6. The compound in accordance with claim 1, 2-chloro-7-amino-11-(4 - methyl - 1 - piperazinyl)dibenz[b,f][1,4]oxazepine succinate.

7. The compound in accordance with claim 1, 2-chloro-7-amino-11-(4 - methyl - 1 - piperazinyl)dibenz[b,f][1,4]oxazepine pamoate.

8. The compound in accordance with claim 1, 2-chloro-7-amino-11-(4 - methyl - 1 - piperazinyl)dibenz[b,f][1,4]oxazepine acetate.

References Cited
UNITED STATES PATENTS
3,660,406    5/1972    Howell et al. ____ 260—268 TR
3,705,245    12/1972   Howell et al. ____ 260—268 TR DONALD G. DAUS, Primary Examiner